United States Patent [19]
Hunt et al.

[11] Patent Number: 5,835,716
[45] Date of Patent: Nov. 10, 1998

[54] METHOD AND SYSTEM FOR BROKERING EXCESS CARRIER CAPACITY

[75] Inventors: William M. Hunt, Shelton; Paul A. Levitsky, Bridgeport, both of Conn.

[73] Assignee: Pitney Bowes Inc., Stamford, Conn.

[21] Appl. No.: 572,916

[22] Filed: Dec. 15, 1995

[51] Int. Cl.$^6$ .................................................. G06F 19/00
[52] U.S. Cl. .............................. 395/200.43; 395/200.32; 395/200.33; 395/200.36; 395/200.44; 705/5; 705/6; 705/406; 705/407
[58] Field of Search .................................. 395/200, 205, 395/206, 500, 200.32, 200.33, 200.36, 200.43, 200.44; 705/5, 6, 10, 37, 406, 407

[56] References Cited

U.S. PATENT DOCUMENTS

| | | | |
|---|---|---|---|
| 4,486,853 | 12/1984 | Parsons | 705/37 |
| 4,554,418 | 11/1985 | Toy | 379/88 |
| 4,713,761 | 12/1987 | Sharpe et al. | 705/30 |
| 5,021,953 | 6/1991 | Webber et al. | 705/6 |
| 5,040,132 | 8/1991 | Schuricht et al. | 707/507 |
| 5,043,908 | 8/1991 | Manduley et al. | 364/478.15 |
| 5,051,914 | 9/1991 | Sansone et al. | 364/478.11 |
| 5,063,507 | 11/1991 | Lindsey et al. | 705/26 |
| 5,222,018 | 6/1993 | Sharpe et al. | 705/30 |
| 5,237,499 | 8/1993 | Garback | 705/5 |
| 5,253,166 | 10/1993 | Dettelbach et al. | 705/5 |
| 5,331,546 | 7/1994 | Webber et al. | 705/6 |
| 5,422,809 | 6/1995 | Griffin et al. | 705/5 |
| 5,576,951 | 11/1996 | Lockwood | 705/27 |
| 5,652,867 | 7/1997 | Barlow et al. | 705/6 |

Primary Examiner—Parshotam S. Lall
Assistant Examiner—Bharat Barot
Attorney, Agent, or Firm—Melvin J. Scolnick; Charles Malandra; David Pitchenik

[57] ABSTRACT

The invention is a method for brokering carrier capacity. The method comprises a dual path; one path that allows entry into a data processing system of available carrier capacity which is comprised of a list of parameters which define that capacity, and the second path which allows access to that capacity. Each entry point to the system has data entry means for either entering carrier capacity or entering a request for available routes, or both. Available capacity entries are confirmed, saved in a transportation database, and assigned a pre-transaction code. Path two involves entering a request for available capacity by defining a requested route based upon a list of parameters. The system compares available capacity with the requested route to determine whether or not a match exists. The system operator selects an appropriate matched entry which must then be confirmed. Upon confirmation, selected matches are saved to a transaction database and assigned a transaction code. If no match is determined, then the requested route data is saved to a request database. A request database locator program is then activated for the purpose of querying the transportation database at pre-determined intervals to determine if a matching capacity has been subsequently entered. If a matching capacity has been subsequently entered, then a prompt is sent to the requesting site indicating that a match has been found and that confirmation is required; otherwise, the request database locator program will continue to query the transportation database until the routine is terminated.

21 Claims, 8 Drawing Sheets

METHOD AND SYSTEM FOR BROKERING EXCESS CARRIER CAPACITY

RELATED APPLICATION

Reference is made to application Ser. No. 08/572,769 (Attorney Docket No. E-443), entitled METHOD AND SYSTEM FOR LISTING, BROKERING, AND EXCHANGING CARRIER CAPACITY, assigned to the assignee of this application and filed on Dec. 15, 1995, now U.S. Pat. No. 5,724,524.

BACKGROUND OF THE INVENTION

The ability of shippers to get parcels from the loading dock to the final destination in shorter time spans and at less cost has increased in recent years. The growth of the overnight carriers, and the consistency of the two and three day delivery carriers has created vast fleets of vehicles representing each of the many transportation modes.

The growth of shipping demand has fueled the drive for efficiencies that each of the carriers has been developing. Technological advances and better methods of doing business have in turn spurred greater demand for carrier services. The net result is that the volume of parcels being shipped has continued to spiral upward.

Systems and methods have been proposed to more efficiently handle the increased volume of parcels and the proliferation of carrier services that are available. Carriers have introduced systems and methods that are targeted to that carrier only. Shippers have looked for systems that provide them with a means to rate or service shop. The object of all of these systems has been to get a parcel on a vehicle for movement from point A to point B.

Carrier Management Systems such as that described in U.S. Pat. No. 5,040,132, SYSTEM FOR PREPARING SHIPPING DOCUMENTS, issued Aug. 13, 1991 to Schuricht et al., are well known to the art. One such system is the E900 Carrier Management System, developed and marketed by the assignee of the present application. The E900 generally includes as peripheral elements: a microprocessor; keyboard; monitor; platform scale; printer; and possibly a scanner. The E900 system automatically prepares documents for shipping articles to any desired number of different receivers by any selected carrier or mode.

The ability of carriers to respond to shipper needs is based on the carrier's capacity. Carrier capacity is the space that is available at any given time in the vehicle representing the carrier's mode of transport. For every shipment that leaves the dock of a shipper bound for a particular destination, a carrier makes available a mode of transportation. Each mode of transportation has its unique vehicle for transport: freight cars via rail; containers via ship; cubic inches via truck; etc.

More often than not, the vehicle utilized by the carrier has "excess capacity." That is, the maximum available space in the vehicle is not fully utilized for the movement of packages or parcels: at takeoff, the plane may have a few cubic feet of space available for shipping; at rollout, the freight train may have some available container space; or, at final pick-up, the truck may have some available space. Excess capacity, therefore, represents revenue or opportunity lost to the carrier.

While accounting for carrier space revenue/costs can be determined in detail by systems such as that described in U.S. Pat. No. 4,713,761, SYSTEM FOR CENTRALIZED PROCESSING OF ACCOUNTING AND PAYMENT FUNCTIONS, issued Dec. 15, 1987 to Sharpe et al., and in U.S. Pat. No. 5,222,018, also for a SYSTEM FOR CENTRALIZED PROCESSING OF ACCOUNTING AND PAYMENT FUNCTIONS, and issued Jun. 22, 1993 to Sharpe et al., these systems do not provide a means or method for determining or defining carrier space; these systems merely provide a revenue or cost value which can then be used for accounting purposes.

Combining carrier space definition together with accounting for that space was accomplished in part by the SABRE Travel Information Network and its successor ADS, both developed by American Airlines, Inc. of Dallas/Ft. Worth Airport, Tex. The above named systems, and their industry counterparts, allow travel agencies and carriers to identify space available by seat or by room, book reservations, and then produce accounting data so that revenue debits and credits can be booked automatically or manually for a variety of report types, and then eventually billed if necessary.

The present invention is an improvement over reservation systems such as SABRE or ADS because the ability to define excess carrier capacity by specific size is more flexible and more precise then the ability to define reserved or booked space as performed in the reservation systems. Additionally, requests for excess space are continually, and automatically, matched against available space until a match is found or until real-time makes a match prohibitive, as when the actual date and time (real-time) is later than the date and time that a particular space was available. Further, the system user has the ability to select the transport mode in determining request parameters; the ability of the reservation systems to provide mixed modal or alternative transport mode selection is limited at best.

Therefore, an object of the present invention is to provide additional revenue or additional cost savings by creating a method of notifying shippers that a carrier has excess capacity. In order to interest shippers in utilizing the available space, carriers can offer the space at a discount or at no-charge, the benefit obtained from "no-charge" space being the goodwill associated with such offerings. The latter could be reserved for special customers who achieve certain efficiencies during a qualifying period. The promotional opportunities are extensive.

A further object of the present invention is to provide a method that can be utilized internally by a company to maximize its own efficiency. Many companies utilize internal fleets of trucks or other vehicles to move product, inventory, or parcels within the company or within a tightly controlled network. The present invention would provide an easy method of locating available carrier capacity within the internal system so that time schedules could be more easily adhered to and the cost of utilizing outside carriers could be reduced.

SUMMARY OF THE INVENTION

According to the invention, the object is achieved and the disadvantages of the prior art are overcome by a method for brokering carrier capacity that provides flexibility to the users as well as the ability to be used within the internal environment of one carrier or within a network of several carriers. Brokering, as used herein, refers to a system that acts as an intermediary between the shipper/user of carrier space and the carrier that has listed the space.

The method comprises a number of steps. These steps occur over a dual path; one path that allows entry of available carrier capacity, and the second path which allows access to that available capacity. The method employs a data processing system, with a real-time clock, supporting an application which embodies the method. There are at least two entry points into the system. Each entry point has a real time clock as well as data entry means for entering either carrier capacity to the system or entering a request for available routes into the system, or both.

Path one involves determining that carrier capacity is to be entered into the application, and then actually making such an entry. Entry data is comprised of a list of parameters which may include: amount of space available, destination; dates and times; rates; and mode of transport. Mode of transport would include, at least: air; ground; ship; rail; and/or mixed modal. Mixed modal is defined as the use of two or more modes of transport within a single route. The entry is then confirmed, saved in a transportation database, and assigned a pre-transaction code.

Path two involves entering a request for available capacity into the system by defining a requested route. The requested route is defined by request data which is comprised of a list of parameters which may include: amount of space required, destination; dates and times; rates; and mode of transport. The fewer parameters that are entered, the greater the scope of the search.

The system utilizes data processing means for determining whether a match can be found between the request for available capacity and what has actually been entered into the transportation database. The system operator making the request for carrier capacity is provided with means for displaying the request made as well as displaying the located matched entries; the display means being preferably a monitor or a printer, or both, operatively connected to the data processing system. The operator can then select an appropriate matched entry from among those displayed. The selection must then be confirmed. Upon confirmation, the selected matched entry is saved to a transaction database and assigned a transaction code. The assignment of a transaction code can then be the initiating step in preparing a bill for services or generating a transaction report.

Within path two of the method, there exists the possibility that no match will be found between what is available and what has been requested. If a null response is received when the requested route is compared with the listing of available capacity entered into the transportation database, then the requested route data is saved to a request database.

A request database locator program is activated within the data processing system for the purpose of querying the transportation database at pre-determined time intervals to determine if a matching route selection has been entered into the transportation database subsequent to the initial request. If a matching route selection has been entered into the transportation database, then a prompt is sent to a display device at the location where the route request was made; the prompt indicating that a match has been found and that the system operator should enter the application to confirm the match.

If, however, a matching route selection has not been entered into the transportation database, then the request database locator program will continue to query the transportation database at pre-determined time intervals until either the date and time of the requested route has exceeded the date and time on the real time clock of the data processing system, or until the query is terminated by the system operator.

DETAILED DESCRIPTION OF THE PREFERRED EMBODIMENTS

Figure 1A:
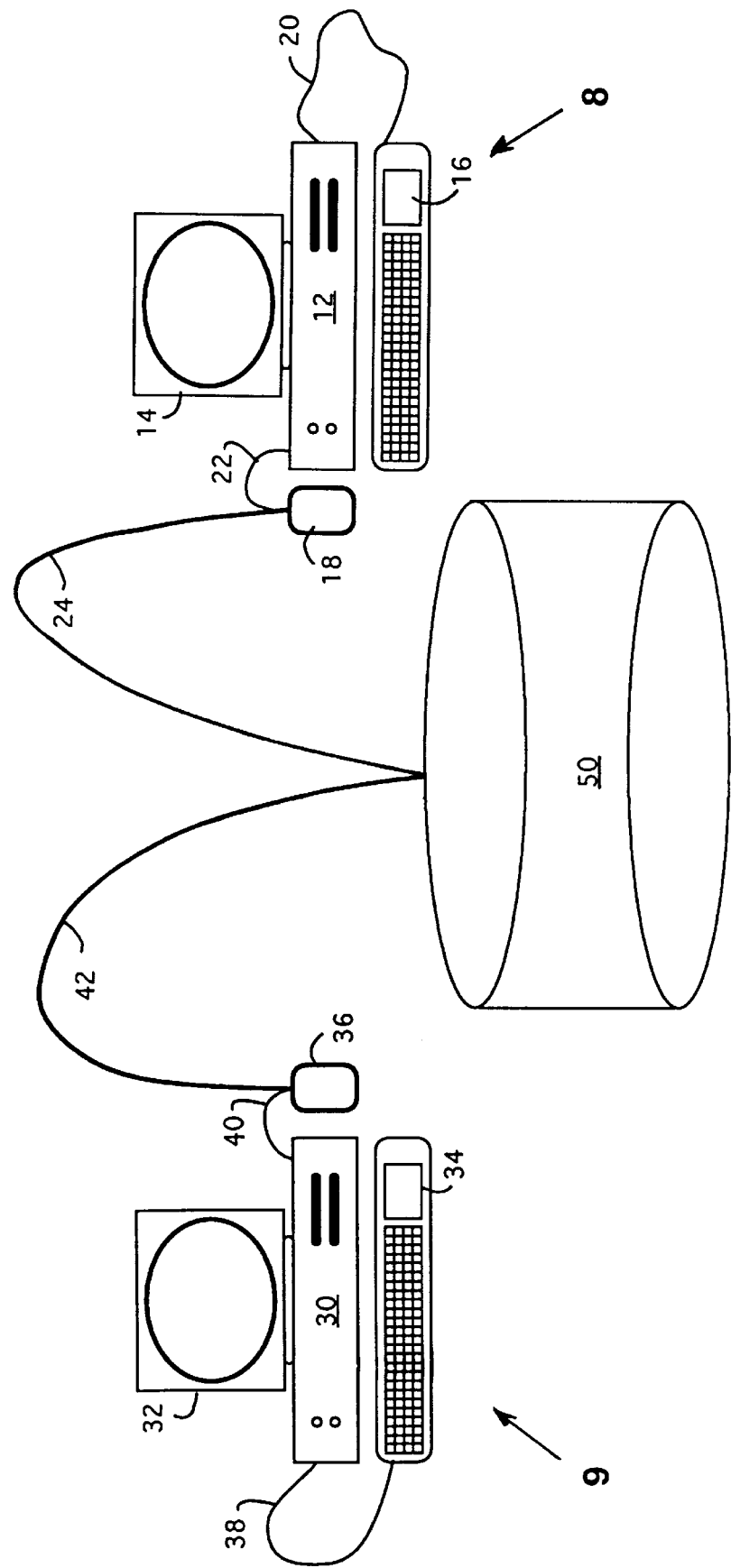
FIG. 1A is a block diagram of an embodiment of a system having a centralized database that can utilize the subject method as disclosed.

Turning to FIG. 1A, there is depicted an embodiment of a system that employs the invention method.

System 10 is comprised of subsystems 8 and 9. Subsystem 8 represents an input/output point at a carrier or shipper site that is porting data to centralized database 50 which can be administered by the carrier, shipper, or a third party. Subsystem 8 further comprises: microprocessor 12, for processing data entered by the system operator, has a real-time clock used for determining when the actual date and time has passed, or is about to pass, the time of performance for the carrier space listed or requested; microprocessor 12 is operatively connected to monitor 14 where the system operator can view entries made to the system, matches available, or receive notification of a match; keyboard 16, which is used to make data entries to the system, is connected to microprocessor 12 by interface cable 20; modem 18, which can transmit or receive data entries or records to or from database 50, is connected to microprocessor 12 by interface cable 22; and, modem 18 which is further connected to database 50 by interface cable 24.

Subsystem 9 represents an input/output point at a carrier or shipper site that is porting data to centralized database 50 which can be administered by the carrier, shipper, or a third party. Subsystem 9 further comprises: microprocessor 30 for processing data entered by the system operator; microprocessor 30 is operatively connected to monitor 32 where the system operator can view entries made to the system, view matches available, or receive notification of a match; keyboard 34, which is used to make data entries to the system, is connected to microprocessor 30 by interface cable 38; modem 36, which can transmit or receive data entries or records to or from database 50, is connected to microprocessor 30 by interface cable 40; and, modem 36 which is further connected to database 50 by interface cable 42.

In an alternative embodiment, modem 18 and/or modem 36 can be connected to database 50 by telephone lines which may further comprise: radio frequency (RF), multichannel (MUX), satellite, microwave, or similar links.

Figure 1B:
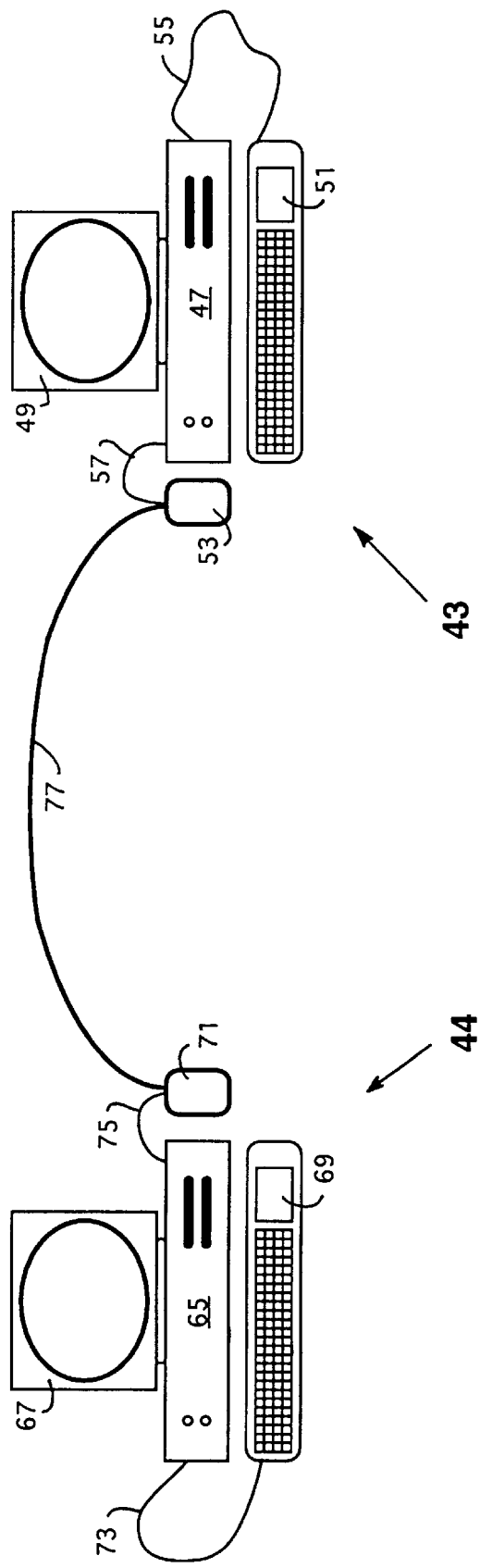
FIG. 1B is a block diagram of an alternative embodiment of a system having point to point communication that can utilize the subject method as disclosed.

Turning to FIG. 1B, there is depicted an embodiment of a system that might employ the invention method. System 45 is comprised of subsystems 43 and 44 and represents a direct point to point system of a type that might be used in an intracompany environment where the database does not have to be separated out from the input/output points. It should be noted that this configuration could be altered to accommodate more than two subsystems; an example is found in FIG. 1C.

Subsystem 43 further comprises: microprocessor 47 operatively connected to monitor 49 for viewing record entries or other data; keyboard 51, for entering data to the system, is connected to microprocessor 47 by interface cable 55; modem 53, for transmitting data, is connected to microprocessor 47 by interface cable 57; and, modem 53 further connected to modem 71 by interface cable 77. Subsystem 44 further comprises: microprocessor 65 operatively connected to monitor 67; keyboard 69 connected to microprocessor 65 by interface cable 73; modem 71 connected to microprocessor 65 by interface cable 75; and, modem 71 further connected to modem 53 by interface cable 77.

In an alternative embodiment, modem 53 and/or modem 71 can be connected to each other by telephone lines which may further comprise: radio frequency (RF), multichannel (MUX), satellite, microwave, or similar links.

Figure 1C:
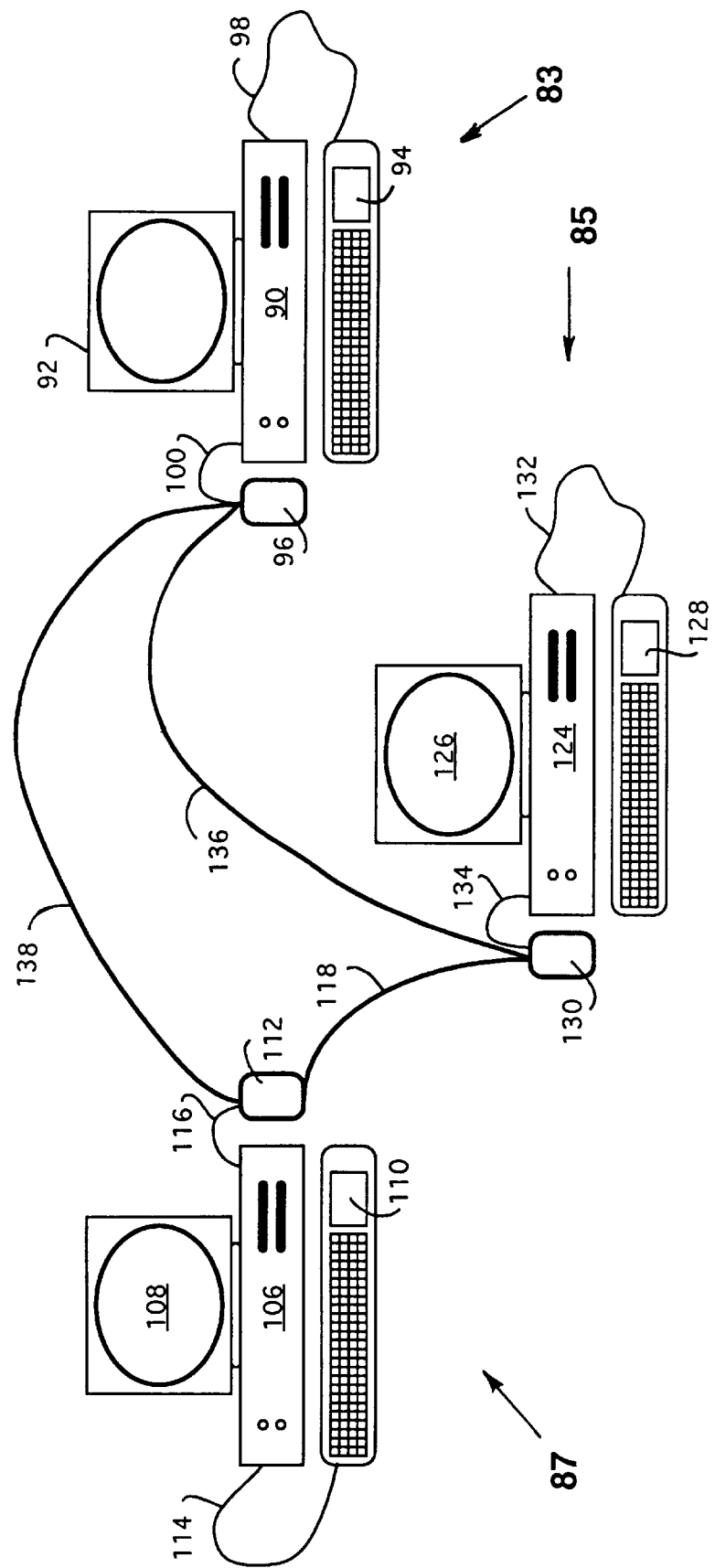
FIG. 1C is a block diagram of an alternative embodiment of a system having multi-node interface that can utilize the subject method as disclosed.

Turning to FIG. 1C, there is depicted an embodiment of a system that might employ the invention method. System 80 is comprised of subsystems 83, 85, and 87 and represents a network of direct point to point systems of a type that might be used in an intracompany environment, or in a shared network environment. The database could reside in any of the three subsystems 83, 85, or 87 or could be located in each of the subsystems when in an environment where the database does not have to be separated out from the input/output points. It should be noted that this configuration does not have to be limited to only three subsystems; additional subsystems could be added.

Subsystem 83 further comprises: microprocessor 90, for processing system data, operatively connected to monitor 92 for displaying data; keyboard 94, for entering data, connected to microprocessor 90 by interface cable 98; modem 96, for communicating data, connected to microprocessor 90 by interface cable 100; modem 96 connected to modem 112 by interface cable 138; and, modem 96 further connected to modem 130 by interface cable 136.

Subsystem 85 further comprises: microprocessor 124, for processing data, operatively connected to monitor 126 for displaying data; keyboard 128, for entering data, connected to microprocessor 124 by interface cable 132; modem 130, for communicating data, connected to microprocessor 124 by interface cable 134; modem 130 connected to modem 112 by interface cable 118; and, modem 130 further connected to modem 96 by interface cable 136. Additionally, subsystem 87 further comprises: microprocessor 106 operatively connected to monitor 108; keyboard 110 connected to microprocessor 106 by interface cable 114; modem 112 connected to microprocessor 106 by interface cable 116; modem 112 connected to modem 130 by interface cable 118; and, modem 112 further connected to modem 96 by interface cable 138.

In an alternative embodiment, modem 96 and/or modem 112 and/or modem 130 can be connected to each other by telephone lines which may further comprise: radio frequency (RF), multichannel (MUX), satellite, microwave, or similar links.

Figure 2:
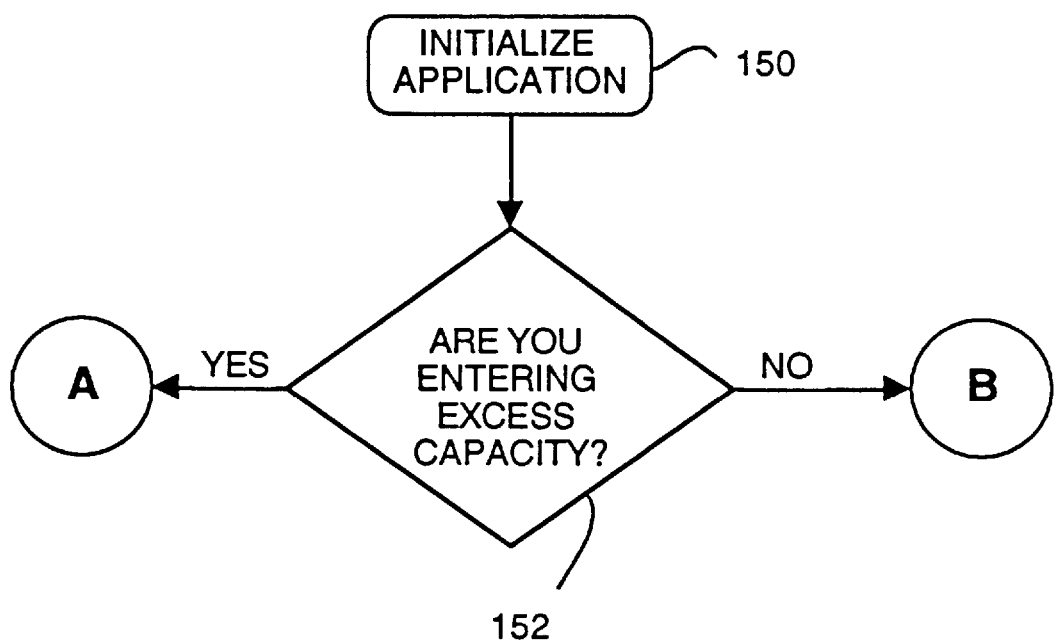
FIG. 2 is a flow chart of the initialization and entry into the two main paths of the method flow.

Turning to FIG. 2, there is depicted a flowchart of the entry into the system application. The application is initialized at step 150 and then advances to step 152. At step 152, the system queries the system operator as to whether or not the system operator is entering excess carrier capacity.

Figure 3A:
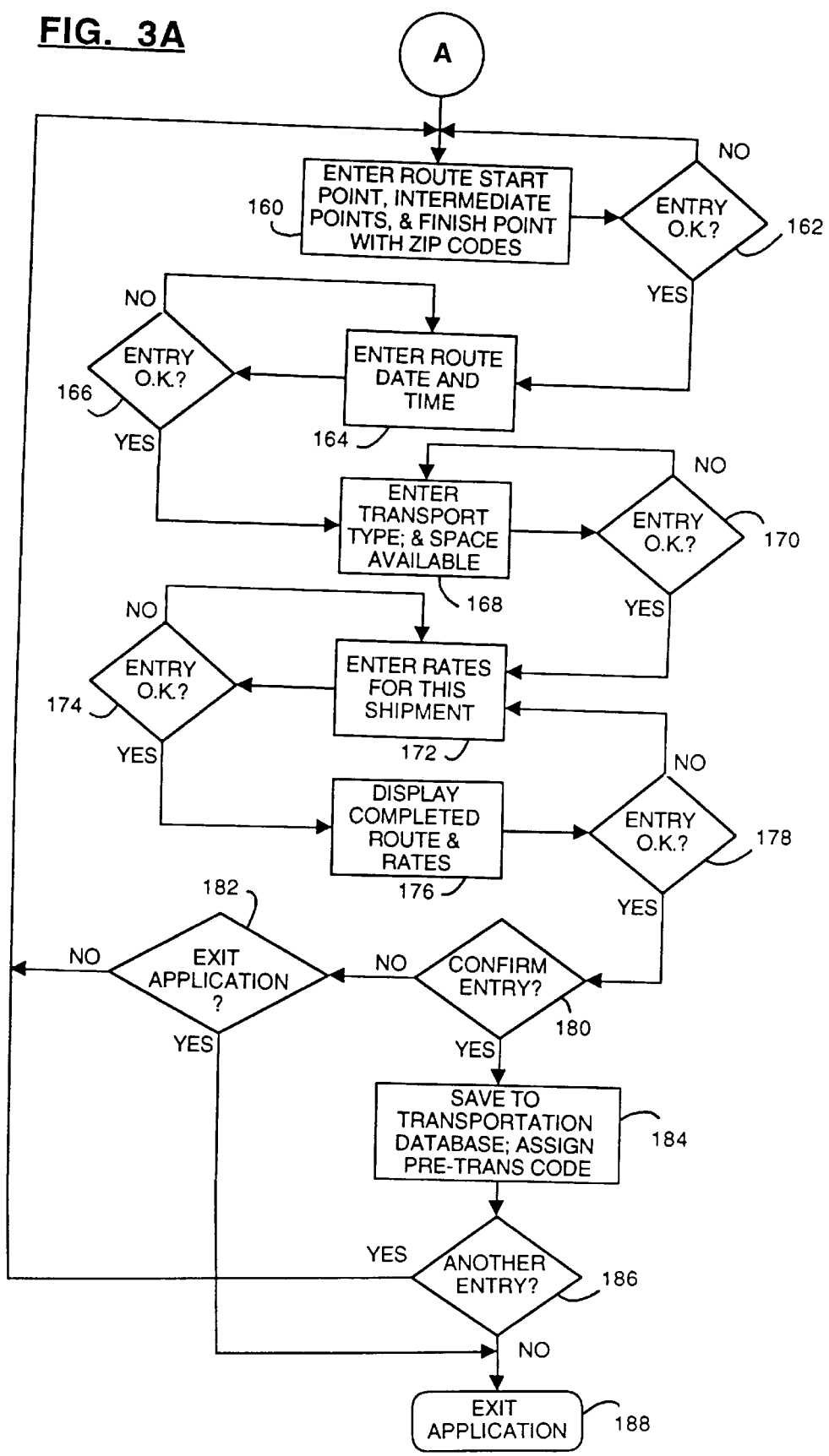
FIG. 3A is a flowchart of the method path whereby excess carrier capacity may be entered into the system for use.
Figure 3B:
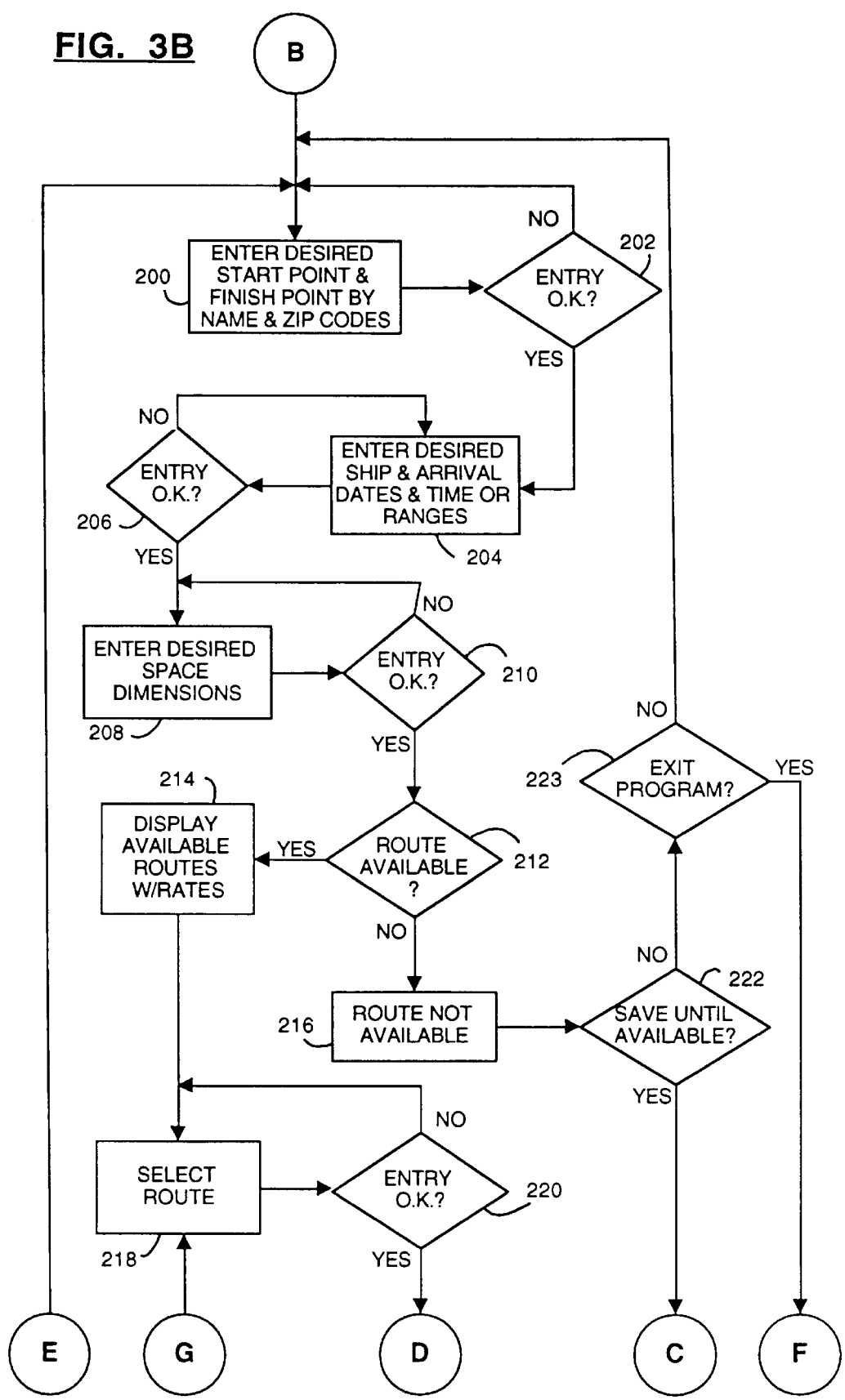
FIG. 3B is a flowchart of the method path whereby a system user can reserve space for use that has been entered into the system by a carrier.

If the response to the query at step 152 is "YES," then the method advances along path A to step 160 which is shown in FIG. 3A. If, however, the response to the query at step 152 is "NO," then the method advances along path B to step 200 which is shown in FIG. 3B.

Turning to FIG. 3A, path A enters at step 160 where the route start point and finish point are entered. It is at this step that intermediate points, if any, can be identified. The preferred method of entry is by using start and destination postal codes (zip code in the United States); these are well known in the art. The degree of accuracy required in establishing pick-up and delivery points can be adjusted according to the type of postal code accepted by the system.

For instance, in the United States, the elements of a postal zip code consist of four parts; these are: (i) the "zip code," which consists of 5 digits and refers to geographic area or zone; (ii) the "Zip+4" further breaks down a zip code region into smaller sub-regions, this code consists of four digits added to the base zip code; (iii) "delivery point digits" which consist of two additional digits that further break down a Zip+4 so that the carrier can more accurately pin point an exact location; and, (iv) a check sum digit; the check sum digit would not be required in the present invention. In the mailing services environment, the delivery point digits are abstracted from the street line of the address using the approved algorithm of the postal service; either the U.S.P.S. algorithm or a proprietary algorithm could be used.

After entry of the route start point and finish point at step 160, the method advances to step 162 where the method queries as to whether or not the entry at step 160 was correct. If the response to the query is "NO," then the method returns to path A for re-entry to step 160. If, however, the response to the query at step 162 is "YES," then the method advances to step 164 where the start and end dates and times of the route are entered into the system.

After entry of the route start and end dates and times at step 164, the method advances to step 166 where the method queries as to whether or not the entry at step 164 was correct. If the response to the query is "NO," then the method returns to step 164 for re-entry of the appropriate data. If, however, the response to the query at step 166 is "YES," then the method advances to step 168 where the mode of transport (i.e., sea, truck, rail, air, mixed modal) and the amount or type of space available are entered into the system.

After entry of the mode of transport and the amount of available space at step 168, the method advances to step 170 where the method queries as to whether or not the entry at step 168 was correct. If the response to the query is "NO," then the method returns to step 168 for re-entry of the appropriate data. If, however, the response to the query at step 170 is "YES," then the method advances to step 172 where the rates and applicable charges are entered into the system.

After entry of the rates at step 172, the method advances to step 174 where the method queries as to whether or not the entry at step 172 was correct. If the response to the query is "NO," then the method returns to step 172 for re-entry of the appropriate data. If, however, the response to the query at step 174 is "YES," then the method advances to step 176 where the entered routes and their corresponding rates are displayed back to the system operator on monitor 14 or alternatively on a printer, or both on a monitor and a printer.

After display of the routes and rates at step 176, the method advances to step 178 where the method queries as to whether or not the entry displayed at step 176 was correct. If the response to the query is "NO," then the method returns to step 172 for re-entry of the appropriate data. If, however, the response to the query at step 178 is "YES," then the method advances to a query at step 180. At step 180, the method queries as to whether or not to confirm the entry displayed at step 176. If the response to the query is "NO," then the method advances to step 182 where the method further queries as to whether or not the application is to be exited. If the response to the query at step 182 is "NO," then the method returns to path A to re-enter at step 160. If, however, the response to the query at step 182 is "YES," then the method advances to step 188 where the application is exited. Returning to step 180, if the response to the query is "YES," then at step 184 the entered route and appropriate rates are saved to the transportation database as available carrier capacity and are assigned a pre-transaction code.

From step 184, the method advances to a query at step 186. At step 186, the method queries as to whether or not another entry is required. If the response to the query is "YES," then the method advances to path A and re-enters at step 160. If, however, the response to the query at step 186 is "NO," then the method advances to step 188 and exits the application.

The pre-transaction code serves the purpose of identifying the available carrier capacity which has been placed in the transportation database at step 184; the code, and a description of the carrier capacity, will be displayed to a system operator when selection of available space is required, and can be further used for identification in preparing reports and in the records necessary for regulated industries or transactions. Neither a discussion nor description of the reports required by the carrier industry or regulating agencies are advanced within this application as they are not required for an understanding of the subject invention.

Turning to FIG. 3B, the flow of path B as it enters from FIG. 2 can be seen. Path B enters at step 200 where the start point and end point of a requested route (requested capacity) are entered. Additionally, from FIG. 3D, path E enters at step 200 as well.

At step 200, the start and end points for the requested route are entered by: street; city; zone; state/province/prefecture; country; and/or postal code. From step 200, the method advances to a query at step 202 which asks if the entry made at step 200 is correct. If the response to the query is "NO," then the method returns to path B and re-enters at step 200. If, however, the response to the query at step 202 is "YES," then the method advances to step 204.

At step 204, the ship date and time and the delivery date and time for the route are entered; it is possible, at this point, to enter ranges for date and time so as to broaden the database search for a match. From step 204, the system advances to a query at step 206. The query at step 206 asks whether or nor the entry made at step 204 is correct. If the response to the query is "NO," then the method returns to 204 where the proper data can be entered. If, however, the response to the query at step 206 is "YES," then the method advances to step 208.

At step 204, the desired space dimensions for the route are entered, and then the method advances to a query at step 210. The query at step 210 asks whether or nor the entry made at step 208 is correct. If the response to the query is "NO," then the method returns to 208 where the proper data can be entered. If, however, the response to the query at step 210 is "YES," then the method advances to step 212.

At step 212, the system queries itself as to whether or not the requested route entered is available. To accomplish the query, the system takes the parameters entered at steps 200, 204, and 208 and compares them to the parameters stored in the transportation database as carrier capacity. If the response to the query is "YES," then the method advances to step 214 where the matching route, or routes, is/are displayed. If, however, the response to the query at step 212 is "NO," then the system advances to step 216 and displays "Route Not Available."

From step 216 the method advances to step 222 and queries as to whether or not the requested carrier capacity parameters should be saved until carrier capacity is made available or until the real time clock of the system has advanced beyond the requested date and time parameters. If the response to the query at step 222 is "NO," then the method advances to step 223 and queries as to whether or not to exit the program. If the response to the query at step 223 is "NO," then the method advances to path B where it re-enters at step 200. If, however, the response to the query at step 223 is "YES," then the method advances along path F to FIG. 3D where it enters at step 256. In looking back to step 222, if the response to the query is "YES," then the method advances along path C to FIG. 3C where it enters at step 224.

Returning to step 214, from the displayed list of available routes, the system operator can scroll up or down the list and select an appropriate route by highlighting the entry and entering the selection at step 218. Also entering at step 218 is path G which originated at step 242 of FIG. 3C. From step 218, the method advances to a query at step 220 which asks whether or not the entry selected at step 218 was the correct entry. If the response to the query is "YES," then the method advances along path D to FIG. 3D where it enters at step 244. If the response to the query at step 220 is "NO," then the method returns to enter the flow just after step 214 and prior to step 218.

Figure 3C:
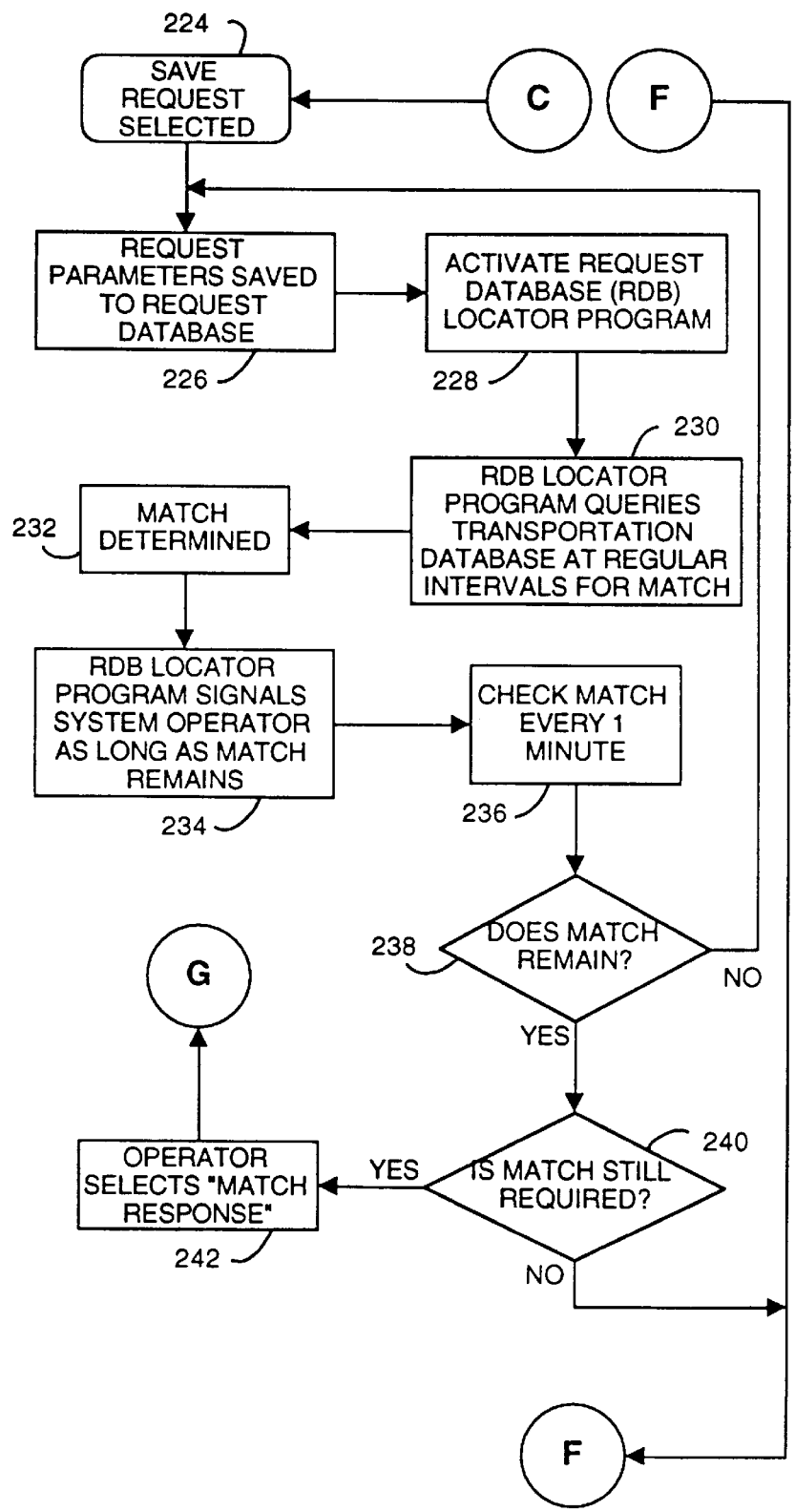
FIG. 3C is a continuation of the flowchart of the method path of FIG. 3B whereby a system user can reserve space for use that has been entered into the system by a carrier.

Turning to FIG. 3C, the method enters at step 224 from path C which had originated at step 222.

At step 224, it is determined that the carrier capacity request be saved and at step 226 the request parameters are saved to the request database. From step 226, the method advances to step 228 and activates the request database (RDB) locator program.

The purpose of the RDB locator program is to query the transportation database at regular intervals that can be programmed at system set-up so as to locate available carrier capacity that may be entered in the system after the initial capacity request is made. The RDB locator program takes the carrier capacity request parameters and asks the transportation database if a suitable match has been entered. The RDB locator program will continue to query the transportation database until it is requested through a pull down menu that the RDB locator program terminate the query, or when the system's real time clock has exceeded the time and date parameters of the carrier capacity request.

Once the RDB locator program is activated at step 228, the method advances to step 230 and begins querying the transportation database at regular intervals for a possible match. If a match is found, the method advances to step 232 where the match is verified; the method then advances to step 234 where the RDB locator program signals the system operator that a match has been located. The RDB locator program will continue to signal the system operator as long as the match remains or until the system operator either selects or discards the match.

From step 234, the method advances to step 236 where the method continues to check at regular intervals that the match still exists. The purpose of the continual match check is to recognize that other carrier capacity requests may be entering the system from other entry points and, that the system operator may not be able to respond to the match notification in a timely manner. From step 236, the method advances to step 238 and queries as to whether or not the match still remains. If the response to the query is "NO," then the method re-enters at step 226; otherwise, if the response to the query is "YES," then the method advances to step 240.

Step 240 queries as to whether or not a match is still required. If the response to the query is "NO," then the method advances to path F which enters at step 254 in FIG. 3D. If, however, the response to the query at step 240 is "YES," then the method advances to step 242 where the system operator selects the match. After selection of the offered match, the method advances along path G to re-enter at step 212 in FIG. 3B.

Figure 3D:
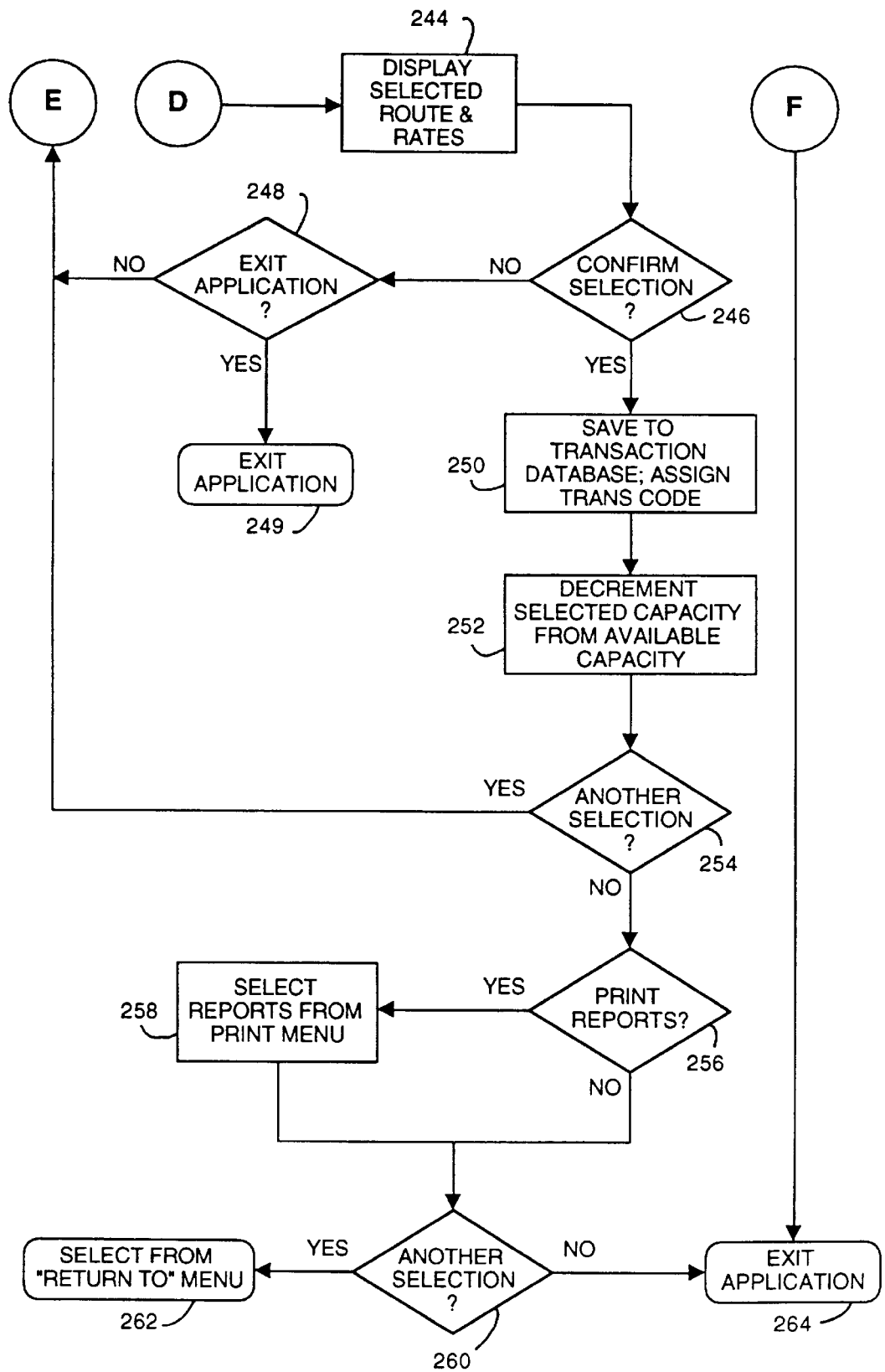
FIG. 3D is a continuation of the flowchart of the method path of FIG. 3C whereby a system user can reserve space for use that has been entered into the system by a carrier.

Turning to FIG. 3D, the method enters at step 244 from path D which had originated at step 214 and, at step 256 from path F which had originated at step 220.

From path D, the method advances to step 244 where the selected route and rates are displayed. The method then advances to step 246 and queries as to whether or not the entry displayed at step 244 is to be confirmed. If the response to the query is "NO," then the method advances to a query at step 248 which asks if the application is to be exited. If the response to the query at step 248 is "NO," then the method advances along path E to re-enter at step 200 in FIG. 3B. If, however, the response to the query at step 248 is "YES," then the method advances to step 249 and exits the application.

Returning to step 246, if the response to the query is "YES," then the method advances to step 250 where the selection is saved to the transaction database and assigned a transaction code. The transaction database will serve as the data base from which a number of different reports and documentation can be generated for the appropriate carrier needs and regulatory authorities. In saving to the transaction database, at step 252, the system decrements the selected capacity from the available capacity stored in the transportation database. From step 252, the method advances to step 254.

At step 254, the method queries as to whether or not another selection is required. If the response to the query is "YES," then the method advances along path E to enter at step 200 in FIG. 3B. It, however, the response to the query at step 254 is "NO," then the method advances to step 256 and queries as to whether or not the system operator wishes to print any of the reports that are available. If the response to the query is "NO," then the method advances to a query at step 260. If, however, the response to the query at step 256 is "YES," then the method advances to step 258 where the system operator can select one or more reports to be printed. From step 258 the method advances to the query at step 260.

The method queries at step 260 as to whether or not the system operator wants to select another activity. If the response to the query is "NO," then the method advances to step 264 and exits the application. If, however, the response to the query at step 260 is "YES," then the method advances to step 262 where the operator can select a next activity from a "RETURN TO" menu. The "RETURN TO" menu allows the system operator to return to step 152 of the method, or to some other point of the method as required.

Once the carrier space has been accounted for through sale or trade, a manifest or similar report can be generated and transmitted to the operator of the transport medium on which the carrier space exists. In so doing, the transport medium operator is provided with an up-to-date accounting of all space for a particular route. The manifest or similar report can be generated at step 256, or alternatively could be an additional activity to be selected at step 262.

As can be appreciated by those skilled in the art, a number of variations of the subject invention are possible. These variations include, but are not limited to: the ability of the system to print reports or generate billings for services at selected steps within the application; the use of a pop-up window instead of a pull-down menu when making decisions within the RDB locator program; the nature and scope of each of the hardware components of the data processing system; the ability of the system to handle more than one carrier and the carriers' respective rates; the ability to scan data into the system; the length of time intervals employed at steps 230 and 236; and, the extent to which data can be downloaded from the system to either a transfer media or to another data processing system.

What is claimed is:

1. A method for brokering carrier capacity comprising the steps of:

(a) entering carrier capacity data from a first node into a transportation database in a data processing system, said capacity data identifying carrier capacity available by specific units of volume for a particular route at a particular time and identifying the mode of transportation;

(b) entering a request for a route into said data processing system at a second node by defining said requested route;

(c) comparing said requested route with said carrier capacity data entered into said data processing system to determine whether or not a route match exists;

(d) displaying a list of matching routes to a system operator;

(e) selecting a matching route from said list of matching routes;

(f) saving said matching route selection to a transaction database;

(g) assigning a transaction code to said saved matching route selection; and (h) decrementing availability of said matching route selection from said data in said transportation database.

2. The method of claim 1, wherein said data processing system utilizes a real time clock whereby said system can determine when carrier capacity listed in said data processing system can no longer be accessed because of a time/date threshold.

3. The method of claim 1, wherein a transaction code is assigned to said matching route selection.

4. The method of claim 2, wherein said entering capacity data step further comprises the steps of:

(a) confirming said entry;

(b) saving said entry in said transportation database; and (c) assigning a pre-transaction code to said entry.

5. The method of claim 2, wherein said entering a request step further comprises the steps of:

(a) defining a location start point of said route and a location end point of said route;

(b) defining a desired date and time for shipping and arrival corresponding to said route start point and said route end point;

(c) choosing a transportation medium; and (d) receiving a confirmation that said requested route has been entered into said data processing system.

6. The method of claim 2, wherein if a null response is received when said requested route is compared with said list of routes entered into said transportation database, then said requested route data is saved to a request database.

7. The method of claim 6, wherein a request database locator program is activated within said data processing system for the purpose of querying said transportation database at pre-determined time intervals to determine if a matching route selection has been entered into said transportation database.

8. The method of claim 7, wherein if said matching route selection has been entered into said transportation database then a prompt is sent to a display device where said route request was made; said prompt indicating that a match has been found and that said system operator should enter said application to confirm said match.

9. The method of claim 8, wherein if said matching route selection has not been entered into said transportation database then said request database locator program will continue to query said transportation database at said pre-determined time intervals until: (i) said date and time of said requested route has exceeded a date and time on said real time clock of said data processing system, or (ii) said query is terminated by said system operator.

10. The method of claim 8, wherein said display is a monitor or a printer operatively connected to said data processing system.

11. The method of claim 2, wherein said data processing system is comprised of a plurality of entry points into said system and each entry point has data entry means for entering either carrier capacity to said system or entering a request for available routes into said system, or both.

12. The method of claim 3, wherein a bill for services, a transaction report, or both, is prepared in respect of said transaction code.

13. The method of claim 2, wherein said entering a request step further comprises the step of defining a location start point of said route and a location end point of said route by causing said start point and said end point to be entered into said data processing means by scanning said start point and said end point into said data processing means with a scanner or optical character reader from a label of a parcel to be shipped or from a printed media.

14. The method of claim 1, wherein said first node and said second node are co-located.

15. Apparatus for brokering carrier capacity, comprising:
    (a) data processing means for accepting a first listing of carrier capacity parameters for a delivery route and storing said parameters for later comparison to a second listing of requested carrier capacity parameters; wherein said carrier capacity parameters further comprise volume increments, mode of transportation, and time parameters of said delivery route; said data processing means further for comparing said first listing to said second listing;
    (b) means for determining a matched entry on said first listing and said second listing based upon said comparison of said carrier capacity parameters of said first listing and/or subsequent listings to said second listing;
    (c) means for displaying said matched entry to a system operator;
    (d) means for selecting said matched entry from among a possible plurality of matched entries;
    (e) means for confirming said selection; and
    (f) means for decrementing a volume measurement representative of said selection from said stored carrier capacity parameters and further for recalculating the available capacity on the basis of units of volume available to said mode of transportation at a particular time.

16. A method for brokering carrier capacity comprising the steps of:
    (a) entering carrier capacity data into a data processing system having a real time clock for comparing actual time with carrier capacity data; said entering step further comprising entering a list of parameters that define available carrier capacity by volume increments into said data processing system, confirming said entry, and then saving said entry in a transportation database as available routes and assigning a pre-transaction code to said entry;
    (b) entering a request for available routes into said data processing system, said request entry step further comprising defining a route and confirming that said defined route is a requested route;
    (c) comparing said requested route with said available routes entered into said transportation database to determine whether or not a route match exists;
    (d) activating a request database locator program within said data processing system for the purpose of querying said transportation database at predetermined time intervals to determine if a matching route selection has been entered into said transportation database;
    (e) displaying a list of matching routes and corresponding pre-transaction code to a system operator;
    (f) selecting a matching route by selecting its code from said list of matching routes, and then confirming said matching route selection; and
    (g) saving said matching route selection to a transaction database and assigning a transaction code to said matching route selection.

17. The method of claim 16, wherein defining a route further comprises the steps of:
    (a) defining a location start point of said route and a location end point of said route;
    (b) defining a desired date and time for shipping and arrival corresponding to said route start point and said route end point;
    and
    (c) choosing a transportation medium.

18. The method of claim 17, wherein said transportation medium comprises a plurality of modes of transportation.

19. The method of claim 17, wherein said transportation medium is a single mode of transportation.

20. The method of claim 16, wherein a bill for services is prepared in respect of said transaction code.

21. The method of claim 16, wherein a transaction report is prepared in respect of said transaction code.

* * * * *